United States Patent Office 3,361,803
Patented Jan. 2, 1968

3,361,803
PROCESS FOR THE PRODUCTION OF ISO-PHTHALIC AND TEREPHTHALIC ACIDS
Zbigniew J. Augustynowicz, Los Angeles, Calif., assignor to Henryk S. Rudzki, Rome, Italy
No Drawing. Filed Mar. 20, 1967, Ser. No. 624,136
6 Claims. (Cl. 260—524)

ABSTRACT OF THE DISCLOSURE

A process for preparing isophthalic and terephthalic acids from the corresponding meta- and para-xylenes which involves: first forming a reaction mixture containing one part by weight of the xylene, 0.01 to 0.13 mol of a catalyst per mol of xylene for the oxidation of the xylene, which catalyst is soluble in liquid ingredients in the reaction mixture, such as cobaltous acetate tetrahydrate, 0.14 to 0.40 part by weight of acetaldehyde serving as an accelerator for the catalyst, 2 to 20 parts by weight of an inert solvent such as acetic acid, and an amount of water of from 0 to 5% by weight of the solvent; and secondary oxidizing the xylene in said reaction mixture at a phthalic acid forming temperature such as a temperature of from 95 to 130° C. and at a phthalic acid forming pressure such as a pressure of from 1 to 30 atmospheres, by passing air through said mixture while maintaining said mixture at such a temperature and pressure.

Cross references to related applications

This application is a continuation-in-part of the copending application of Zbigniew J. Augustynowicz, Ser. No. 281,819, filed May 20, 1963, entitled "Process for the Production of Isophthalic and Terephthalic Acids."

Background of the invention

Both isophthalic and terephthalic acids are presently being used to an increasing extent in the manufacture of various different polymers such as are used for films, fibers and the like. As a result of this increased use of these acids there is a need for new and improved methods for manufacturing these acids more economically than they would be produced by prior known processes.

It has been known to produce isophthalic and terephthalic acids by two-state oxidation processes in which either meta- or para-xylene is first converted into a corresponding toluic acid, and then such acid is further oxidized into the final product. Two-state processes of this type are comparatively complex. They are considered to be economically unsatisfactory because of various factors such as the relatively high comparative cost of the equipment required, the relative costs of carrying out the process steps, the comparatively low yields achieved, and the costs of removing toluic acid impurities from the final acid products.

A number of efforts have been made in order to provide various different oxidation products such as isophthalic and terephthalic acids by direct one-step oxidation. An early disclosure in this field is found in the Loder U.S. Patent 2,245,528. This patent teaches the oxidation of any of a large number of different ring-substituted aromatic compounds by contacting oxygen or air with a liquid mixture of the aromatic compound to be oxidized, any of a variety of different solvents, any of a large number of different catalysts, and any of a large number of different initiators, while the mixture is maintained at an elevated temperature and pressure.

The Loder patent contributed little of direct value to the industry as far as the production of phthalic acids is concerned. In the only example of this patent pertaining to the production of such acids, Example 3, a mixture of xylenes, acetic acid, cobalt and manganese acetate catalysts, and diethyl ketone as an activator or initiator for the catalysts, was oxidized with air at a temperature of 187 to 202° C. at a pressure of 50 atmospheres. As a result of this process, only a 2% yield of phthalic acids was obtained. The principal yield was 50.3% toluic acid. A number of other toluic acid derivatives were formed, all except one of them in amounts greater than the yield of phthalic acids. Toluic acid is an objectionable impurity in phthalic acids. These yields of phthalic acids by the Loder process were hardly significant.

Others have attempted to modify or improve upon the basic type of process disclosed in the Loder patent in order to obtain satisfactory, economic production of phthalic acids. In the Brill U.S. Patent 2,853,573 and in a corresponding article entitled, "Terephthalic Acids by Single Stage Oxidation," appearing in the October 1960 issue of Industrial and Engineering Chemistry, page 837, there is disclosed one of such efforts. The process disclosed in the Brill patent and the corresponding article involves the oxidation of xylene in a mixture of an acetic acid solvent, cobalt acetate tetrahydrate catalyst, and methylethyl ketone activator for the catalyst by means of pure oxygen or partially diluted oxygen having a partial pressure of at least 0.85 atmosphere of oxygen at a temperature of 60 to 120° C., and at a pressure of from 1 to 5 atmospheres.

The Brill teachings, in effect, follow the lead of the earlier Loder patent by using a ketone as an activator for the oxidation of a xylene. In connection with the activator for the catalyst, Brill specifically taught that there was a lack of functional and economic equivalency of the various different types of catalyst activators or initiators suggested by Loder. Brill did this by disclosing that aldehydes, such as acetaldehyde, were more rapidly oxidized under the oxidation conditions of this type of process than ketones, and that because of such oxidation a large total amount of an aldehyde, such as acetaldehyde, equal to a molar excess over the amount of the hydrocarbon present would have to be used as an activator. Brill disclosed that ketones were more desirable than aldehydes as activators since they were not oxidized as rapidly as aldehydes, and that, therefore, only a molar fraction of such ketones need be used. On the basis of these teachings, the economic detriment to the use of acetaldehyde as an activator for a ketone is quite apparent. Prior to the present invention, all known processes which specifically involved the use of acetaldehyde as an activator for the cobalt catalyst required the employment of a molar excess of acetaldehyde relative to the xylene, generally 2 to 10 mols of acetaldehyde per mol of xylene.

Subsequent work on providing phthalic acids by the direct oxidation of xylenes from a liquid mixture has established the validity of the earlier Loder and Brill teachings with respect to the use of ketonic activators or initiators. This is shown by the Ardis et al. U.S. Patent 3,036,-122 which regarded the use of ketones as activators or initiators as an "essential requirement" in the production of phthalic acids in a process which is closely related to the Loder and Brill processes.

From these prior processes, it is clearly apparent this "art" taught that if the acetaldehyde were used as an activator or initiator in the production of phthalic acids from xylene, a molar excess of the acetaldehyde relative to the amount of the xylene employed would be required. The use of large amounts of acetaldehyde as an activator would obviously add substantially to the cost of a phthalic acid product, not only because of the cost of the aldehyde itself, but also because of the cost of separating the final product from the other ingredients at the close of the process. Also, when a greater amount of an activator such as acetaldehyde is used in this type of process, when a lesser amount of another activator such as a ketone is capable of performing satisfactorily, the equipment required has to be larger and more expensive than in the latter case.

At times it is considered that it may be possible to accept the disadvantages growing out of use of an aldehyde as an activator in the basic type of oxidation of xylenes suggested by or based upon the earlier Loder teachings. A process of the type considered to accept the disadvantages of the use of a relatively large amount of acetaldehyde activator is shown in the Thompson et al. U.S. Patent 3,240,803, issued after the filing of the above-noted co-pending application Ser. No. 281,819. In the Thompson et al. process, a specialized apparatus is used in carrying out the oxidation of xylenes in the presence of acetic acid solvent, cobalt acetate catalyst and acetaldehyde serving as an activator for the catlyst. This process uses large quantities of acetaldehyde as an activator as indicated necessary by the early Brill process, and, hence, produces significant quantities of acetic acid. This Thompson et al. process is primarily designed to effect a crystallization and a classifying type of effect involving forming aggregates of phthalic acid.

The economics of the manufacture of acetic acid and the manufacture of phthalic acid are normally considered to be separate matters. A manufacturer may have use for phthalic acids but not have any use or convenient market for acetic acid. This is considered to be important in considering the reasons for the present invention.

Summary of the invention

A primary purpose of this invention is the economic production of phthalic acids by direct one-stage oxidation of xylenes. Thus, the present invention is not directed to the production of economically significant quantities of by-products such as acetic acid, or to the production of small quantities of phthalic acids along with various larger yields of other compounds such as toluic acids and various derivatives of toluic acids. A further purpose of this invention is to provide a process for the production of phthalic acids which may easily and conveniently be carried out using relatively "small" equipment in terms of the equipment which the prior art would indicate to be necessary.

As an aid to understanding this invention, it can be indicated that it involves a process wherein in a first step a reaction mixture is formed containing one part by weight of at least one xylene, a catalyst for the oxidation of the xylene which is soluble in the liquid ingredients of the reaction mixture, an amount of acetaldehyde no greater than 0.40 part by weight and at least sufficient to maintain unoxidized acetaldehyde in the reaction mixture during the subsequent step, and an inert carboxylic acid solvent. As a second step, the xylene within the mixture is directly oxidized to the corresponding phthalic acid by passing air through the mixture while it is maintained at a phthalic acid forming temperature and pressure. It can be considered that a third step of the process involves the separation of the phthalic acid produced in this manner.

It is a feature of the present invention that it makes possible the production of high yields of high quality phthalic acids from xylenes, and especially isophthalic acid and terephthalic acid from meta-xylene or para-xylene (or mixtures thereof), by such a liquid phase air-oxidation in an acetic acid medium (or other lower aliphatic carboxylic acid solvent), with the aid of a cobalt catalyst and acetaldehyde as activator therefor, without requiring the use of the large amouns of acetaldehyde heretofore considered necessary. Thus, it is possible to obtain high yields of phthalic acids of high purity by carrying out the oxidation of xylenes with the use of substantially less than one mol of acetaldehyde per mol of xylene, more particularly not more than 40%, and especially not more than 35%, by weight of the xylene employed, as activator for the cobalt catalyst in the above process.

It is a further feature of the present invention that by including in the initial reaction mixture containing the xylene a substantial amount of the acetaldehyde (an amount at least sufficient to maintain unoxidized acetaldehdye in said mixture during the oxidation, more particularly at least 15% and preferably 20% of the weight of xylene present in the mixture), the xylene is oxidized to phthalic acid with formation of only small amounts of toluic acid.

It is an additional feature of the present invention that, in order to obtain satisfactory yields of terephthalic acid with the limited amounts of acetaldehyde employed in accordance with my invention, the amount of water present in the initial reaction mixture (that is, prior to formation of water by the oxidation reaction) should be limited to a maximum of about 5%, more particularly to 4% and in general to 2.5%, of the weight of the acetic acid or other lower aliphatic carboxylic acid solvent employed. This is surprising because water is formed as a by-product during the course of the reaction, and heretofore even processes employing acetaldehyde as activator have tolerated the use of concentrations of water as high as 20% of the weight of acetic acid initially employed.

Detailed description

In practicing the present invention, relatively pure meta- or para-xylene can be used. In general, the greater the degree of purity of the xylene employed, the greater the degree of purity of the final product. However, the purity of the particular xylene used is not considered extremely significant as far as the results achieved with the process herein concerned. Thus, the particular xylene utilized may contain trace or small quantities of various ingredients which are inert, or substantially inert, with respect to the various materials present during the oxidation. Xylenes of relatively high purity are commercially available and can be acquired without difficulty at an economically feasible cost.

The catalyst for causing oxidation of xylene in the process of this invention must of necessity be chosen by taking into consideration the solubility of the catalyst in the particular solvent employed in order to create a catalyst solution. These factors are, of course, related to the properties of the xylene which is oxidized in accordance with this invention and, hence, both the catalyst and the solvent employed must be chosen so as to form what may be considered as a "coordinated" system capable of producing satisfactory yields of a desired dicarboxylic derivative of xylene.

Particularly favorable results are achieved utilizing acetic acid as solvent together with cobalt acetate tetrahydrate as catalyst. Since the solvent used in practicing the present invention serves solely as an inert solvent, various other aliphatic carboxylic acids of a known type such as propionic or butyric acid are capable of being substituted for the acetic acid used in the preferred mode of practicing the present invention.

Inasmuch as the presence of water in the initial reaction mixture in amounts in excess of about 5% of the weight of the solvent tends to inhibit the desired oxidation reaction and leads to other disadvantages, the amount of water present in the acetic acid preferably should be limited. While it is possible to use glacial acetic acid or other anhydrous lower aliphatic monocarboxylic acids as the solvent medium in the practice of the present invention, a small amount of water is preferably included in the initial reaction mixture to assist in rendering the cobalt acetate tetrahydrate catalyst soluble in the mixture. Accordingly, in the practice of the present invention, the initial reaction mixture contains about 1% to about 5% and preferably 1% to 4%, especially 1.5 to 2.5% of water based on the weight of the acetic acid or other lower aliphatic carboxylic acid solvent (on an anhydrous basis). Such preferred practice can be achieved by using acetic acid of from 96 to 99% purity and containing as an impurity only water and trace quantities of other materials; and by substantially excluding water from the other components of the initial reaction mixture.

A surprising aspect of the invention is the importance of the water content specified in the preceding paragraph. To obtain maximum yields, the water content of the initial reaction mixture should be limited as indicated in the preceding discussion. This, however, does not mean that the water content of the initial reaction or oxidation mixture remains constant or should be held at these levels. During the subsequent oxidation, water is, of course, formed as a by-product, and the water concentration is built up in the reaction mixture during the process to significantly higher levels than those specified. This is not considered to affect the yields obtained so long as the initial reaction or oxidation mixture has a water content as specified.

The amount of the solvent present in the reaction mixture in carrying out the oxidation process of the present invention can be varied. Enough of the solvent should be used to enable the crystals of phthalic acid formed during the process of this invention to be kept in suspension without difficulty. If an excess of solvent is employed the diluting effect of the solvent with respect to the reactants present tends to slow up the desired speed at which the oxidation can be carried out, in addition to increasing the size of the equipment required. Presently preferred results can be achieved utilizing from two to five parts by weight of solvent per part by weight of the xylene used; but if desired, from two to twenty parts by weight of solvent can be used per part by weight of xylene. Quantities of solvent within these ranges can be adjusted as desired in accordance with mechanical considerations relating to the handling of the reaction mixture resulting from the practice of the present invention.

It is preferred to utilize cobaltous acetate tetrahydrate as a catalyst in practicing this invention because of the effectiveness of this compound and because of its solubility in the solvent as indicated hereinbefore. It is, however, possible in practicing the present invention to utilize other known cobalt salts which are soluble in the particular acid utilized as a solvent. If desired, cobalt oxide may also be utilized as a catalyst. Various other related metal salt catalysts for the oxidation of a xylene can at least in theory be substituted for such cobalt compounds, but it is presently considered that the results achieved with such other catalysts are not as economically satisfactory as those achieved with cobalt compounds as described and, hence, such other catalysts are preferably not utilized in practicing the present invention.

In practicing the present invention, from about 0.01 to about 0.13 mol of the cobalt salt serving as a catalyst should be used per mol of xylene present. If smaller quantities of the catalyst are used, the reaction speeds and yields of phthalic acid obtained are decreased to an economically disadvantageous value; while the use of greater amounts of catalyst than those falling within this range does not appear to have any added beneficial effect. Preferably from 0.02 to 0.05 mol of the cobalt salt catalyst is used per mol of a xylene in order to obtain optimum results.

Considerations similar to those set out above apply to the utilization of acetaldehyde, the preferred compound used in the limited amounts set out herein to promote the action of the cobalt catalyst. At least in theory, various other aliphatic aldehydes can be substituted for the acetaldehyde, but the results achieved with such other aldehydes, when interpreted in view of economic considerations, are not justified or do not make their use desirable. The aldehyde used preferably should be substantially free from water, so that the total water content of the initial reaction mixture does not exceed the water content based upon the solvent present as set forth in the preceding portions of this specification.

The amount of acetaldehyde present in the reaction mixture is an important feature of this invention, as pointed out hereinabove, and is preferably determined with respect to the reaction speeds, so as to insure that at least a relatively small quantity of non-oxidized activator is always present during the time when the xylene present is being oxidized. In general, satisfactory results can be achieved when the total amount of the acetaldehyde activator employed is from 15% to 40%, more particularly 20% to 40% of the weight of the xylene being oxidized. It is presently preferred to utilize not more than 35% by weight of acetaldehyde, based on the total weight of the xylene employed.

In carrying out the process of this invention in accordance with a preferred procedure, the foregoing mixture of the xylene being oxidized, solvent, catalyst and activator is prepared utilizing proportions of these materials as are disclosed herein. This mixture is then gradually heated to and maintained at a temperature within the range of from 95° to 130° C. as the air used as an oxidizing agent is introduced into the reaction vessel in contact with said mixture at an elevated pressure of from 1 to 30 atmospheres or higher. The air is continuously introduced into contact with this reaction mixture as the mixture is agitated until such time as substantially all of the xylene present is converted into the corresponding phthalic acid. As the process is carried out the acetaldehyde accelerator is oxidized to acetic acid. Additional solvent, activator and xylene may be added in the above proportions to the reaction vessel as the initial charge of this vessel is being reacted. To obtain desired yields, such additions should preferably have the same composition as the initial reaction mixture.

Temperatures within the range specified are considered important in practicing this invention under the above conditions. At lower temperatures the desired reactions do not proceed to any significant extent; while at higher temperatures there is a tendency for reactions to transpire yielding other than desired reaction products. Preferably the temperatures used fall within a range of from 95° to 120° C., since maximum yields consistent with ease and economic considerations are achieved within this range.

The some considerations apply to the pressures noted above. If the pressures do not fall within the broad range of from 1 to 30 atmospheres, economically significant yields are not considered to be produced. Preferably the pressure used falls within the range of from 3 to 15 atmospheres.

It is considered significant that air is effective in carrying out the oxidation step referred to in the preceding. It will be recognized that the use of air is economically advantageous as compared to the use of pure oxygen, or air enriched with oxygen. It is also considered significant that the quantity of various impurities normally found in air are not considered to affect the yields obtained by the process herein described. Inasmuch as the oxidation is, of course, affected by the quantity of oxygen in contact with the various ingredients in the reaction mixture, it is considered necessary to continuously circulate air through the reaction mixture at a rate sufficient to maintain at least 4% of oxygen and preferably at least 10% oxygen in the exit gas coming from the reaction mixture. In general, if the exit gas contains less oxygen than indicated there will be a tendency for the desired reactions to proceed at an undesirably slow rate.

The above process conditions are maintained in carrying out the process until such time as substantially all of the xylene present is converted to the desired phthalic acid.

After the reaction is complete, the reaction vessel is cooled, preferably to below 95° C., and the reaction mixture is removed from the reaction vessel and treated so as to recover the phthalic acid produced. During this recovery step the solvent solution containing the cobalt salt and any solvent solution used in washing the product can be recovered and concentrated so as to be utilized virtually as many times as desired in repeatedly carrying out the process.

The process of this invention outlined in the preceding discussion is considered to be significantly advantageous because of the relatively high yields of desired products which can be achieved with it as well because of the ease and economic advantages obtainable with this process. With the present process yields of from 95 to 97% of isophthalic acid or terephthalic acid product, based on the weight of xylene charged to the reactors, can be consistently achieved from the corresponding meta- and para-xylenes.

This process can readily be distinguished from a number of related prior processes with a minimum of difficulty. Unlike prior processes such as that of Brill, referred to above, which are primarily effective when utilized with pure oxygen, the process herein set forth is effective with atmospheric air being utilized as the source of oxygen. Obviously it is economically preferable to utilize air as a source of oxygen in preference to pure oxygen.

The process of this invention is also distinguishable from prior related processes because of the limited quantity of acetaldehyde used as an activator and the effectiveness of such limited quantity, as well as the limited quantity of water initially present in the reaction mixture. In prior related single-stage oxidation processes as have been employed with various xylenes, comparatively large quantities of aldehydes have been used in order to secure the desired oxidation, and the adverse effect of large amounts of water in the initial reaction mixture was not recognized.

The following examples describe specific embodiments of the invention and illustrate the best method contemplated for carrying it out. It is to be understood that these examples are intended to serve primarily as an aid to understanding this invention and are not to be considered as limiting this invention as defined by the appended claims. Percentages are by weight and temperatures are in degrees centigrade.

*Example 1*

A mixture of the following ingredients:

| | | |
|---|---|---|
| Acetic acid of 99% purity | kg | 1.5 |
| p-Xylene | kg | 0.50 |
| Cobaltous acetate tetrahydrate | g | 90 |
| Acetaldehyde | g | 110 | was placed in an inert metal autoclave of 10 liter capacity equipped with a conventional rapid stirrer, pressure gauge, internal heating and cooling coils, thermometer, heating jacket, top gas and liquid inlet valves, and a bottom drain valve.

As the mixture within this autoclave was continuously stirred, water was circulated in the internal coils to bring the temperature of the mixture to 95° C. When this temperature was achieved, atmospheric air was pumped into the vessel so that a pressure of 5 atmospheres was reached in the autoclave. Air was then continuously supplied to the vessel so as to maintain this pressure within it as a limited quantity of air was continuously removed from it during the remainder of the oxidation step. This quantity of air removed was regulated so that, as reaction was carried out, the exhaust air contained approximately 4 to 5% oxygen.

Almost immediately after the 95° temperature and a pressure as indicated were reached, a reaction started. Thereafter the heating of the reaction vessel was stopped and water was circulated in the cooling coil, so as to maintain the reaction temperature at between 110 and 115° C. After this latter temperature had been achieved a mixture of 3 kg. acetic acid (99% purity), 0.28 kg. acetaldehyde and 0.90 kg. p-xylene was added to the reaction vessel gradually over a period of an hour and a half. Then air was continuously applied to the autoclave for another one hour period.

At the end of this time the autoclave was cooled to below 95° C. and the contents of the autoclave were removed from it. The terephthalic acid precipitate in the resultant mixture was then separated and washed with acetic acid at 95° C. and then with water at the same temperature in order to place into solution any trace or substantially trace quantities of p-toluic acid which might be present and in order to remove any oxalic acid resulting from the oxidation of the acetaldehyde. The precipitate was then air dried. This precipitate weight 2.150 kg., corresponding to a 97% yield of terephthalic acid on the basis of the p-xylene charged.

*Example 2*

The mixture resulting from the process set forth in Example 1, after the elimination of the terephthalic acid, together with the acetic acid solution used in washing the terephthalic acid produced were distilled or fractionated so as to lower the water content of this mixture to 1% by weight of the acetic acid. The volume of this mixture was adjusted to the volume of the initial mixture specified in Example 1 by decanting off excess solution. Then the resulting mixture was admixed with the identical quantities of acetaldehyde and p-xylene specified in the preceding example. The procedure set forth in this Example 1 was then repeated. Substantially the same yield of terephthalic acid was achieved as indicated in Example 1.

The procedure outlined in this example has been repeated, utilizing recycled catalyst and solvent, more than sixty times without additional catalyst being required.

*Example 3*

The equipment and procedure in this example are identical to the equipment and procedure set forth in Example 1 with the exception of the fact that meta-xylene was substituted for the para-xylene set forth in Example 1. The identical quantities of these two xylenes were used. A yield of 2.100 kg. isophthalic acid of high purity was achieved. This was approximately a 97% yield on the basis of the meta-xylene charged.

*Example 4*

The equipment and procedure used in this example were identical to the equipment and procedures set forth in Example 2 except, however, that the procedure followed in this example utilized the fraction obtained after the separation of isophthalic acid in Example 3. A yield of 2.120 kg. of high purity isophthalic acid was obtained.

The procedure utilized in this example has been repeated, using recycled catalyst and solvent more than 70 times without additional catalyst being required.

*Example 5*

The equipment specified in Example 1 can be charged with 1 kg. meta-xylene, 9.01 mol per mol of the xylene of cobalt acetate tetrahydrate, 2 kg. acetic acid (98% purity) and 200 g. acetaldehyde. The autoclave used can then be heated to 95° C. and maintained at this temperature while air at one atmosphere is continuously passed over the reacting mixture. After consumption of oxygen from this air ceases, the contents of the autoclave can be cooled and the resulting isophthalic acid separated.

*Example 6*

The equipment specified in Example 1 can be charged with one kg. p-xylene, 100 g. of cobalt acetate tetrahydrate (0.02 mol per mol of the xylene), 6 kg. acetic acid (98% purity) and 350 g. acetaldehyde. The autoclave used can then be heated to 110° C. and maintained at this temperature while air at 30 atmospheres is continuously passed over the reacting mixture. After consumption of oxygen from this air ceases, the contents of the autoclave can be cooled and the resulting terephthalic acid separated.

*Example 7*

The equipment specified in Example 1 can be charged with one kg. meta-xylene, 0.05 mol per mol of xylene of cobalt acetate tetrahydrate, 20 kg. acetic acid (98% purity) and 280 g. acetaldehyde. The autoclave used can then be heated to 120° C. and maintained at this temperature while air at 10 atmospheres is continuously passed over the reacting mixture. After consumption of oxygen from this air ceases, the contents of the autoclave can be cooled and the resulting isophthalic acid separated.

*Example 8*

Equipment similar to that employed in Example 6, but in which the air is passed through the reaction mixture, is charged with one kg. para-xylene, 0.01 mol per mol of the xylene of cobalt acetate tetrahydrate, 5 kg. acetic acid (99% purity), and 220 g. acetaldehyde. The autoclave used is then heated to about 115° C. and maintained at this temperature while air at 10 atmospheres is continuously passed through the reacting mixture, while regulating the flow so that the vent gas contains 10% oxygen. After consumption of oxygen from this air has ceased, the contents of the autoclave are cooled and the resulting terephthalic acid separated. A yield of over 97% of high purity terephthalic acid, based on the weight of xylene charged, is obtained.

I claim:
1. An improved process for preparing a phthalic acid by passing air at a phthalic acid forming temperature and pressure in contact with a liquid mixture of a xylene to be oxidized to said phthalic acid, a cobalt catalyst for the oxidation of said xylene, an activator for said cobalt catalyst, and an inert lower aliphatic carboxylic acid solvent, wherein the improvement comprises:
   said mixture initially contains per part by weight of said xylene an amount of acetaldehyde from 0.15 to 0.35 part by weight and at least sufficient to maintain unoxidized acetaldehyde in said mixture during the oxidation step at the process, from 2 to 20 parts by weight of said carboxylic acid solvent, and an amount of water no greater than about 5% by weight of the solvent;
   passing air under pressure in contact with said mixture while maintaining said mixture at said phthalic acid forming temperature and pressure, said temperature being from 95 to 130° C., the amount of air passing in contact with said mixture being sufficient so that the air coming from said mixture contains at least 4% by weight of oxygen; and
   recovering phthalic acid from the resulting mixture.

2. A process as claimed in claim 1 wherein:
   the xylene within said mixture is selected from the group consisting of meta-xylene and para-xylene;
   the carboxylic acid solvent within said mixture is acetic acid; and
   said mixture initially contains an amount of water equal to from about 1 to about 5% by weight of said acetic acid.

3. A process as claimed in claim 2 wherein:
   said mixture initially contains from 2 to 5 parts by weight of said acetic acid;
   said mixture initially contains from 0.20 to 0.35 part by weight of said acetaldehyde;
   said mixture contains 0.02 to 0.05 mol of said catalyst per mol of said xylene; and
   said temperature is from 95° to 130° C. and said pressure is from 1 to 30 atmospheres.

4. A process as claimed in claim 2 wherein:
   said mixture initially contains from 0.20 to 0.35 part by weight of said acetaldehyde;
   said mixture initially contains an amount of water equal to from about 1 to about 4% by weight of the weight of said initial acetic acid;
   said mixture contans at least 0.01 mol of said catalyst per mol of said xylene; and
   said temperature is from 95° to 130° C. and said pressure is from 1 to 30 atmospheres.

5. A process as claimed in claim 2 wherein:
   said mixture initially contains from 2 to 5 parts by weight of said acetic acid;
   said mixture initially contains from 0.20 to 0.35 part by weight of said acetaldehyde;
   said mixture contains 0.02 to 0.05 mol of said catalyst per mol of said xylene;
   said temperature is from 95° to 120° C. and said pressure is from 1 to 30 atmospheres; and
   the amount of air passed in contact with said mixture is sufficient so that the air coming from said mixture contains at least 10% by weight oxygen.

6. A process as claimed in claim 5 wherein:
   said mixture initially contains an amount of water equal to from about 1.5 to about 2.5% by weight of the weight of said initial acetic acid.

No references cited.

LORRAINE A. WEINBERGER, *Primary Examiner.*

S. WILLIAMS, *Assistant Examiner.*